United States Patent [19]

Shimizu et al.

[11] Patent Number: 5,742,474
[45] Date of Patent: Apr. 21, 1998

[54] ELECTRIC DOUBLE LAYER CAPACITOR

[75] Inventors: Tatsuhiko Shimizu; Hiroyuki Kimoto; Shoji Yokoishi, all of Susono, Japan

[73] Assignee: Toyota Jidosha Kabushiki Kaisha, Aichi-Ken, Japan

[21] Appl. No.: 678,459

[22] Filed: Jul. 9, 1996

[30] Foreign Application Priority Data

Jul. 17, 1995 [JP] Japan ................................ 7-180034
May 15, 1996 [JP] Japan ................................ 8-119882

[51] Int. Cl.⁶ .......................... H01G 9/00; H01G 9/016
[52] U.S. Cl. .......................... 361/502; 361/512; 361/508; 361/503; 361/516
[58] Field of Search ................................ 361/500, 502, 361/503, 504, 512, 524, 508, 505, 525, 528, 532; 29/25.03

[56] References Cited

U.S. PATENT DOCUMENTS 4,737,889  4/1988  Nishino et al. ........................ 361/502

FOREIGN PATENT DOCUMENTS 6-176970  6/1994  Japan.

*Primary Examiner*—Leo P. Picard
*Assistant Examiner*—Anthony Dinkins
*Attorney, Agent, or Firm*—Finnegan, Henderson, Farabow, Garrett & Dunner, L.L.P.

[57] ABSTRACT

An electric double layer capacitor which is usable at a high voltage without causing an irreversible current. Both a polarized positive electrode 14 and a polarized negative electrode 16 are made of the same constituents. However, a ratio of an amount of constituents of the polarized positive electrode 14 differs from that of the polarized negative electrode 16. A ratio of a capacitance of the polarized positive electrode to a capacitance of the polarized negative electrode is controlled such that the polarized positive electrode and the polarized negative electrode simultaneously reach respective potentials where the irreversible current is caused. According to this invention there is an advantage that it is possible to increase a voltage applied to the electric double layer capacitor.

5 Claims, 1 Drawing Sheet

ELECTRIC DOUBLE LAYER CAPACITOR

BACKGROUND OF THE INVENTION

1. Field of the Invention

This invention relates to an improvement in an electric double layer capacitor used for storing energy.

2. Description of the Related Art

Electric double layer capacitors have been used to store energy. An example of such capacitors is shown and described in Japanese Patent Laid-Open Publication No. Hei 6-176970.

FIG. 2 of the accompanying drawings shows a cross section of the foregoing electric double layer capacitor. The capacitor comprises a pair of collectors 10 and 12, a polarized positive electrode 14, a polarized negative electrode 16, and a separator 18. The polarized positive electrode 14 is disposed on the collector 10 while the polarized negative electrode 16 is disposed on the collector 12.

These polarized positive and negative electrodes 14 and 16 include activated carbon and carbon black bound onto aluminum nets. An amount (g) of carbon and carbon black bound per unit area (1 cm$^2$) is approximately equal in both the polarized positive and negative electrodes 14 and 16.

The separator 18 is interposed between the polarized positive and negative electrodes 14 and 16. The electrodes 14, 16 and the separator 18 are saturated with an electrolyte. The conventional electric double layer capacitors described above have relatively small energy density compared with that of an accumulator in a lead battery or the like. Thus, if it is installed in a motor vehicle so as to store regenerated energy, the capacitor inevitably becomes large and heavy.

The electrical double layer capacitor has electric characteristics similar to those of a condenser, and its energy capacity E is expressed by ½ CV$^2$ (E=½ CV$^2$). In order to increase the energy capacity E, the applied voltage must be increased. When a voltage of approximately 2.2 volts or higher is applied between the positive and negative electrodes in order to increase the energy capacity E, an irreversible current is caused due to decomposition of the electrolyte and so on. This would degrade the performance of the electric double layer capacitor, and would make the capacitor less durable. In order to overcome this problem, it is a prerequisite that conventional electric double layer capacitors be used with voltages of approximately 2.2 volts or lower.

SUMMARY OF THE INVENTION

The invention is designed so as to overcome the problems of the electric double layer capacitor of the prior art, and is intended to provide an electric double layer capacitor which can be used at higher voltages without causing any irreversible current.

According to a first aspect of the invention, there is provided an electric double layer capacitor comprising: a pair of collectors; a polarized positive electrode disposed on one of the collectors and a polarized negative electrode disposed on the other collector; a separator interposed between the polarized positive electrode and the polarized negative electrode; and an electrolyte applied between the polarized positive and negative electrodes and the separator. In this electric double layer capacitor, a ratio of capacitance of the polarized positive electrode to capacitance of the polarized negative electrode is determined in accordance with a potential of the polarized positive electrode and a potential of the polarized negative electrode which cause an irreversible current.

In this electric double layer capacitor, the ratio of the capacitances depends upon a ratio of constituents of the polarized positive electrode to constituents of the polarized negative electrode.

The ratio of the constituents of the polarized positive electrode to the constituents of the polarized negative electrode is determined such that as more charges are reserved by the polarized positive electrode and the polarized negative electrodes, both of the polarized positive electrode and the polarized negative electrode simultaneously reach potentials where the irreversible current is caused.

The collectors are made of aluminum foil. The polarized positive electrode and the polarized negative electrode include activated carbon and carbon black which are caked using polytetra fluoroethylene (PTFE) as a binder. The electrolyte is a solution of tetraethyl ammonium tetrafluoroborate dissolved in propylene carbonate. Further, a quantitative ratio W$^+$ of the constituents of the polarized positive electrode to W$^-$ of the constituents of the polarized negative electrode is above 1.2 and below 4 (i.e. 1.2<W$^+$/W$^-$<4).

The quantitative ratio may be 1.4<W$^+$/W$^-$<2.5.

These and other objects, features and advantages of the invention will be better understood from consideration of the following detailed description taken in conjunction with the accompanying drawings.

BRIEF DESCRIPTION OF THE DRAWINGS

Throughout the drawings, like components are assigned like reference numerals.

DESCRIPTION OF THE PREFERRED EMBODIMENT

Figure 1:
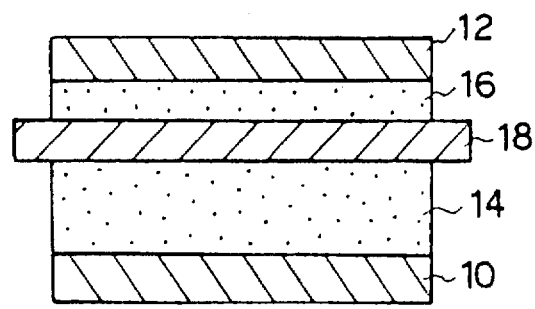
FIG. 1 is a cross section of an electric double layer capacitor according to an embodiment of the invention.
Figure 2:
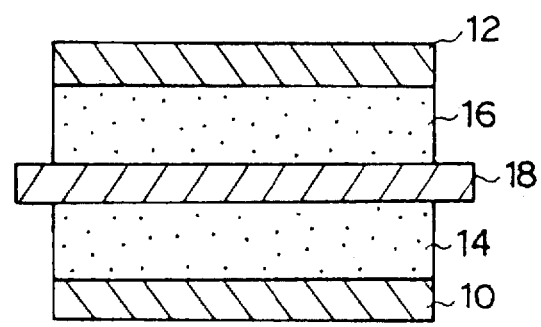
FIG. 2 is a cross section of an electric double layer capacitor of the related art.

Referring to FIG. 1, a collector 10 accompanies a polarized positive electrode 14 (called the "positive electrode 14") while a collector 12 accompanies a polarized negative electrode 16 (called the "negative electrode 16"). These positive and negative electrodes 14 and 16 include activated carbon and carbon black which are caked using PTFE as a binder. The carbon black is effective in enhancing the conductivity of the polarized electrodes. Each of the collectors 10 and 12 is made of aluminum foil. The positive and negative electrodes 14, 16 are coated on the aluminum foil as the collectors 10, 12, and are then baked after being pressed.

A separator 18, which is made of a polyolefin-based porous film, is interposed between the positive and negative electrodes 14, 16. The positive and negative electrodes 14, 16 and the separator 18 are saturated with an electrolyte, which contains one mol/liter of tetraethyl ammonium tetrafluoroborate (Et$_n$N•BF$_4$) dissolved in a solvent of propylene carbonate.

In this invention, the amount (g) of the activated carbon and carbon black bound per electrode unit area (1 cm$^2$) of the positive electrode 14 is more than that of the negative electrode 16, i.e. the positive electrode 14 is thicker than the negative electrode 16, as shown in FIG. 1.

The electric double layer capacitor has electrical characteristics similar to those of a condenser. Thus, the more charges Q are stored in the positive and negative electrodes 14, 16, the larger a potential difference between the positive and negative electrodes 14, 16. In order to increase the charges Q stored in the positive and negative electrodes 14, 16 (i.e. the energy capacity E), the voltage applied between these electrodes must be raised. However, with the increase in the applied voltage, an irreversible current is caused due to the decomposition of the electrolyte and so on, once the positive and negative electrodes 14, 16 reach certain potentials. If the capacitor is being used in this state, the positive and negative electrodes 14, 16 would be degraded. Therefore, it is necessary to maintain the potentials of the positive and negative electrodes 14, 16 below the potential where the irreversible current is caused (called the "decomposition potential").

The inventors have noted that the positive and negative electrodes have different decomposition potentials at which the irreversible current is caused. Hereinafter, it is assumed that 0 V denotes a potential where the positive and negative electrodes are shorted.

As more charges Q are stored in the electric double layer capacitor, the potentials of the positive and negative electrodes have opposite polarities of an equal magnitude, and increasing absolute values. Thus, irreversible current is caused in the positive or negative electrode whose absolute value of the decomposition potential is smaller. Thus, if one electrode having the larger absolute value of the decomposition potential can be modified such that it can simultaneously reach its decomposition potential when the other electrode having the smaller absolute value of decomposition potential reaches its decomposition potential, the potential difference between the positive and negative electrodes in this state, i.e. an applied voltage, is the maximum voltage for the electric double layer capacitor.

On the other hand, the potentials of the positive and negative electrodes 14, 16 depend upon their single-electrode capacitances C and stored charges Q. The potentials $\phi$ of the positive and negative electrodes have a relationship expressed as $\phi=Q/C$. Since the amounts of the stored charges Q are equal in the positive and negative electrodes 14, 16, the potential $\phi$ varies with the single-electrode capacitance C of each electrode. The single-electrode capacitances C of the electrodes 14, 16 are adjusted to appropriate values such that the potentials of these electrodes can be respectively controlled to different values when the capacitor stored the charges Q.

The invention features that a ratio of the single-electrode capacitance of the positive electrode 14 to that of the negative electrode 16 is made to vary with the absolute values of the decomposition potentials of the electrodes 14 and 16, so that the electrodes 14, 16 can simultaneously reach their own decomposition potential.

The ratio of the single-electrode capacitance of the positive electrode 14 to that of the negative electrode 16 can be changed by modifying their respective constituents, e.g. a quantitative ratio of the activated carbon in the positive electrode 14 to that in the negative electrode, or a ratio of a surface area of the activated carbon in the positive electrode 14 to that in the negative electrode. Further, when the positive and negative electrodes include the same constituents, the ratio of the single-electrode capacitance can be varied by changing a ratio of the amount of carbon and carbon black per electrode unit area in the positive electrode 14 to that of the negative electrode 16. The ratio of the amount of carbon and carbon black per electrode unit area is defined as $W^+/W^-$, where $W^+$ is the amount of the carbon and carbon black per unit area ($cm^2$) of the positive electrode 14, and $W^-$ is the amount of the carbon and carbon black per unit area of the negative electrode 16. This ratio is called "the quantitative ratio" hereinafter.

Table 1 lists voltages (applied between the electrodes) where irreversible current was caused when they were applied to the positive and negative electrodes 14, 16 which were assembled to form cells by changing the quantitative ratio. In this case, the potentials of the positive and negative electrodes 14, 16 were measured using an $Ag/Ag^+$ ion reference electrode, and are shown as potentials $\phi+$ and $\phi-$ of the positive and negative electrodes. In Table 1, it was assumed that when the positive and negative electrodes were.

TABLE 1

| The quantitative ratio | 1 | 1.2 | 1.75 | 2.5 | 4 |
|---|---|---|---|---|---|
| Potential $\phi+$ (V) of positive electrode | 1.1 | 1.1 | 1.1 | 0.8 | 0.5 |
| Potential $\phi-$ (V) of negative electrode | −1.1 | −1.3 | −1.9 | −1.9 | −1.9 |
| Voltage (V) applied between electrodes | 2.2 | 2.4 | 3.0 | 2.7 | 2.4 |

In Table 1, the quantitative ratio "1" denotes the constituents of the conventions electric double layer capacitor. The positive and negative electrodes 14, 16 have equal quantitative ratios. When the voltage applied between the positive and negative electrodes is raised to 2.2 volts, the electrodes 14 and 16 have the same single-electrode capacitance, so that they have positive and negative potentials of 1.1 volts and −1.1 volts, respectively. This represents that the irreversible current is caused due to the decomposition of the electrolyte and so on at these potentials. However, it is not known which of the positive or negative electrode caused the irreversible current.

When the quantitative ratio of the electrodes 14, 16 is 1.2 and when a voltage of 2.4 volts is applied between the electrodes 14, 16, the potential of the positive electrode was 1.1 volts and that of negative electrode was −1.3 volts, and an irreversible current was caused. When comparing this case with the case of the quantitative ratio "1", it is understood that the irreversible current is caused when the potential of the positive electrode is 1.1 volts in either case. Therefore, it is obvious that the irreversible current is caused when the potential of the positive electrode is raised to 1.1 volts, and an irreversible current was caused. In other words, the decomposition potential is 1.1 volts for the positive electrode 14.

Next, when the quantitative ratio is 2.5 and a voltage applied between the electrodes is raised to 2.7 volts, the potential of the positive electrode is 0.8 volts while that of the negative electrode is −1.9 volts. In this case, the irreversible current is assumed to have been caused in the negative electrode 16 because the potential of the positive electrode 14 is below 1.1 volts. Thus, it is understood that the negative electrode has the decomposition potential of −1.9 volts.

From the foregoing, it has been confirmed that the irreversible current is caused in the positive electrode 14 at 1.1 volts, and in the negative electrode at −1.9 volts. When the quantitative ratio is set to an appropriate value between 1.2 and 2.5, there should be a maximum voltage to be applied between the electrodes such that the irreversible current is caused when the potential positive electrode is 1.1 volts and simultaneously the potential of the negative electrode is −1.9 volts. For this purpose, the quantitative ratio is set to 1.75 so as to check the voltages where the irreversible current is caused. Referring to Table 1, the irreversible current is caused when a voltage of 3.0 volts is applied between the positive and negative electrodes having the potentials of 1.1 volts and −1.9 volts, respectively. This combination of the potentials of the positive and negative electrodes 14, 16 and the inter-electrode voltage of 3.0 volts is maximum for the electric double layer capacitor of the present invention. In other words, the quantitative ratio 1.75 is optimum for the electric double layer capacitor.

Further, when the quantitative ratio is raised to 4, and when a voltage of 2.4 volts is applied between the electrodes, the irreversible current is caused at 0.5 volts in the positive electrode and at −1.9 volts in the negative electrode. In this case, the inter-electrode voltage is higher than the voltage with respect to the quantitative ratio 1 in the conventional capacitor, which means an increase in usable voltages.

On the basis of Table 1, the quantitative ratio $W^+/W^-$ is above 1.2 and below 4 (i.e. $1.2<W^+/W^-<4$). It can be seen that a usable voltage can be raised compared with the conventional electric double layer capacitor.

Further, the quantitative ratio is preferably above 1.4 and below 2.5 (i.e. $1.4<W^+/W^-<2.5$).

The irreversible current is considered to be caused mainly by the decomposition of the electrolyte. The irreversible current is also considered to be caused on a boundary face of the collector 10 or 12 or the electrode 14 or 16. Thus, it is possible to raise the decomposition potential, at which the irreversible current is caused by changing constituents and types of the collectors 10, 12, the positive and negative electrodes 14, 16 and the electrolyte. This will enable the electric double layer capacitor to be usable at higher voltages.

The invention allows the positive and negative electrodes to be applied with voltages in accordance with their decomposition potentials through optimization of the ratio between the single-electrode capacitances of the positive and negative electrodes. This enables the electric double layer capacitor to be usable with higher voltages.

What is claimed is:

1. An electric double layer capacitor comprising:
   (a) a pair of collectors;
   (b) a polarized positive electrode disposed on one of the collectors and a polarized negative electrode disposed on the other collector;
   (c) a separator interposed between the polarized positive and the polarized negative electrode; and
   (d) an electrolyte applied between the polarized positive and negative electrodes and the separator,
   wherein a ratio of a capacitance of the polarized positive electrode to a capacitance of the polarized negative electrode is changed so as to raise the respective potentials of the positive and negative electrodes which cause an irreversible current.

2. The electric double layer capacitor according to claim 1, wherein the ratio of the capacitances depends upon a ratio of constituents of the polarized positive electrode to constituents of the polarized negative electrode.

3. The electric double layer capacitor according claim 2, wherein the ratio of the constituents of the polarized positive electrode to the constituents of the polarized negative electrode is determined such that as more charges are stored by the polarized positive electrode and the polarized negative electrodes, both the polarized positive electrode and the polarized negative electrode simultaneously reach potentials where the irreversible current is caused.

4. An electric double layer capacitor comprising:
   (a) a pair of collectors made of aluminum foil;
   (b) a polarized positive electrode disposed on one of the collectors and a polarized negative electrode disposed on the other collector, wherein said polarized positive and negative electrodes include activated carbon and carbon black which are caked by polytetrafluoroethylene as a binder;
   (c) a separator interposed between the polarized positive and the polarized negative electrodes; and
   (d) an electrolyte comprising a solution of tetraethyl ammonium tetrafluoro borate dissolved in propylene carbonate applied between the polarized positive and negative electrodes and the separator,
   wherein a ratio of a capacitance of the polarized positive electrode to a capacitance of the polarized negative electrode is changed so as to raise the respective potentials of the positive and negative electrodes which cause an irreversible current,
   and wherein said ratio of the capacitances depends upon a ratio of $W^+$ constituents of the polarized positive electrode to $W^-$ constituents of the polarized negative electrode which is above 1.2 and below 4 (i.e., $1.2<W^+/W^-<4$).

5. The electric double layer capacitor according to claim 4, wherein the ratio $w^+/w^-$ is above 1.4 and below 2.5 (i.e. $1.4<W^+/W^-<2.5$).

* * * * *

UNITED STATES PATENT AND TRADEMARK OFFICE
CERTIFICATE OF CORRECTION

PATENT NO. : 5,742,474
DATED : April 21, 1998
INVENTOR(S) : Tatsuhiko SHIMIZU et al.

It is certified that error appears in the above-indentified patent and that said Letters Patent is hereby corrected as shown below:

Claim 3, col. 6, lines 11, after "according", insert --to--.

Claim 5, col 6, line 45, after "i.e.", insert --,--.

Signed and Sealed this

Fourth Day of August, 1998

Attest:

Attesting Officer

BRUCE LEHMAN

Commissioner of Patents and Trademarks

UNITED STATES PATENT AND TRADEMARK OFFICE
CERTIFICATE OF CORRRECTION

PATENT NO. : 5,742,474
DATED : April 21, 1998
INVENTOR(S) : Shimizu, et al It is certified that error appears in the above-identified patent and that said Letters Patent is hereby corrected as shown below:

On the title page, under item [56], insert the following:

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | JP | 0 | 81 | 0 | 70 | 4 | 7 | 23 Apr 96 | Japan (w/abstract) | | | | |
| | | | | | | | | | | | | | |

FOREIGN PATENT OR PUBLISHED FOREIGN PATENT APPLICATION

Signed and Sealed this

Second Day of March, 1999

Attest:

Attesting Officer

Q. TODD DICKINSON

Acting Commissioner of Patents and Trademarks